United States Patent
Mäckel et al.

(10) Patent No.: US 6,433,442 B1
(45) Date of Patent: Aug. 13, 2002

(54) METHOD AND APPARATUS FOR OPERATING A SAFETY DEVICE FOR MOTOR VEHICLES

(75) Inventors: Rainer Mäckel, Königswinter; Thomas Schulz, Unterensingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/569,082

(22) Filed: May 11, 2000

(30) Foreign Application Priority Data

May 14, 1999 (DE) .......................................... 199 22 331

(51) Int. Cl.[7] .............................................. B60R 16/04
(52) U.S. Cl. ........................ 307/10.7; 307/10.1; 307/121
(58) Field of Search ................................. 307/9.1, 10.1, 307/10.7, 121

(56) References Cited

U.S. PATENT DOCUMENTS

| | | | |
|---|---|---|---|
| 3,536,876 A | | 10/1970 | Lastinger et al. ............ 200/161 |
| 4,563,968 A | | 1/1986 | Wawrzynek |
| 4,740,178 A | | 4/1988 | Badenhorst et al. ......... 439/758 |
| 4,798,968 A | * | 1/1989 | Deem ........................ 307/10.7 |
| 5,142,162 A | * | 8/1992 | Sundeen et al. ............ 307/10.7 |
| 5,170,151 A | * | 12/1992 | Hochstein .................. 307/10.7 |
| 5,272,386 A | * | 12/1993 | Kephart ..................... 307/116 |
| 5,321,389 A | * | 6/1994 | Meister ..................... 307/10.7 |
| 5,691,619 A | * | 11/1997 | Vingsbo ..................... 320/13 |
| 5,693,986 A | * | 12/1997 | Vettraino, Jr. et al. ..... 307/10.7 |
| 6,049,140 A | * | 4/2000 | Alksnat et al. ............. 307/10.7 |
| 6,066,899 A | * | 5/2000 | Rund et al. ................. 307/10.7 |
| 6,087,737 A | * | 7/2000 | Alksnat et al. ............. 307/10.7 |
| 6,111,327 A | * | 8/2000 | Bae .......................... 307/10.7 |
| 6,166,454 A | * | 12/2000 | Schaller et al. ............ 307/10.7 |
| 6,198,995 B1 | * | 3/2001 | Settles et al. .............. 307/10.7 |
| 6,201,318 B1 | * | 3/2001 | Guillory .................... 307/10.7 |
| 6,268,663 B1 | * | 7/2001 | Abe et al. .................. 307/10.7 |

FOREIGN PATENT DOCUMENTS

| | | |
|---|---|---|
| DE | 1 086 322 | 2/1957 |
| DE | 27 32 794 A1 | 7/1977 |
| DE | 28 36 041 A1 | 8/1978 |
| DE | 29 19 021 A1 | 5/1979 |
| DE | 29 19 022 A1 | 5/1979 |
| DE | 33 03 185 A1 | 2/1983 |
| DE | 33 27 532 A1 | 7/1983 |
| DE | 34 02 372 A1 | 1/1984 |
| DE | 38 27 045 A1 | 8/1988 |
| DE | 40 40 405 A1 | 12/1990 |
| DE | 41 10 240 C1 | 3/1991 |
| DE | 41 37 146 A1 | 11/1991 |
| DE | 91 15 293.3 | 12/1991 |
| DE | 42 11 578 C1 | 4/1992 |
| DE | 42 31 970 C2 | 9/1992 |
| DE | 92 12 878.5 | 11/1992 |
| DE | 92 16 774.8 | 12/1992 |
| DE | 44 04 909 A1 | 2/1994 |
| DE | 196 03 117 A1 | 1/1996 |

* cited by examiner

Primary Examiner—Fritz Fleming
(74) Attorney, Agent, or Firm—Crowell & Moring LLP

(57) ABSTRACT

A method for operating a safety device for motor vehicles which contains a multistage high-current battery isolating switch, disconnection of the battery from the vehicle's electrical system being blocked by vehicle operating signals, is characterized in that, to reactivate the vehicle, door contact switches are actuated and feed battery current to a switching logic which actuates the battery isolating switch by motor operation, in such a way that said switching logic moves the battery isolating switch into a standard position which connects the vehicle's electrical system to the battery.

21 Claims, 3 Drawing Sheets

METHOD AND APPARATUS FOR OPERATING A SAFETY DEVICE FOR MOTOR VEHICLES

The invention concerns a method and apparatus for operating a safety device for motor vehicles.

BACKGROUND

A known safety circuit of this type in the form of an isolating switching device for motor vehicles is presented in DE 33 27 532 A1. It responds primarily to electrical instructions from an emergency instruction transmitter, that is to say it can be switched under remote control and permits the battery to be isolated from the vehicle's electrical system; however, it permits this not only in emergency cases but also when the vehicle is parked. Such a stationary vehicle turn-off circuit is, owing to an prevention circuit, permitted only when the engine is stationary or if no other current loads are connected into the circuit in the motor vehicle. However, it is a problem here that, in order to maintain its operational readiness, the control circuit remains connected to the battery even when disconnection from the vehicle's electrical system has taken place, and said control circuit continues to consume current, that is to say cannot be used for a relatively long stationary period of the vehicle or relatively long period of overseas transportation. The disconnection of the battery from the vehicle's electrical system is ultimately carried out by means of self-latching relays which possibly experience contact problems or tend towards contact sticking at the very high currents which occur here.

In modern motor vehicles, the number of electrical control units is increasing at an ever faster rate in accordance with the number of loads dependent on a vehicle's electrical system, with the result that, in order to increase the operational reliability, the control units are usually networked by means of a vehicle-internal bus system and receive digital switching signals from a central control device in a type of ring circuit, said switching signals being decrypted in the control units using microprocessors and being converted into appropriate instructions to the directly adjacent receivers.

Such databus systems in a motor vehicle are usually based on the so-called CAN standard (Controller Area Network). Therefore, as a rule, the control units and the microprocessors arranged in them change into a quiescent or sleeping mode after a delay time, dependent on the type of control unit, after the vehicle has been deactivated. In this state, the quiescent current consumption of the control unit is relatively low, but in total it can still amount to a current of several hundred mA which permanently loads a vehicle battery, in particular if a primed monitoring system is added to this.

If such a vehicle is then stationary over a relatively long time without the battery being able to be loaded by the generator when the engine is running, for example during a relatively long period of absence of the keeper of the vehicle, when the vehicle is taken out of service for the winter or during a relatively long period of transportation overseas by ship, such severe discharge may occur, in conjunction with the self-discharge of the battery which always occurs and which cannot be avoided, that under certain circumstances even the vehicle battery is irreparably damaged, or at any rate it is no longer possible for the vehicle to be started.

Such exhaustive discharge of batteries also gives rise to lasting damage because during normal operation the electrical voltage which is generated by the electrical charge at the electrodes protects said electrodes against the aggressiveness of the sulphuric acid. If this voltage collapses owing to an exhaustive discharge, the protection of the electrodes also fails and disintegration phenomena occur, which even after a short time damage the electrodes irreparably to such an extent that the drastic damage to the storage capacity destroys the storage function of the battery.

A vehicle with a highly discharged battery is frequently reactivated, that is to say started up, by starting using external means by connecting a second battery, usually originating from another vehicle, in parallel with the discharged vehicle battery. However, in such a case it is not unusual, especially at night, for the poles to be mixed up, as a result of which not only the vehicle battery which is in any case greatly weakened but also the electrical devices and control units in the vehicle, that is to say the entire electrical system of the vehicle including the generator and generator diodes as well as the electronics can suffer lasting damage.

If the vehicle's own, in this respect first, battery is very exhaustively discharged, an attempt at starting by external means can also fail because the voltage of the vehicle's electrical system can drop, as a result of the high current which the starter and furthermore also the exhaustively discharged first battery require during the starting time, below a limiting value of, for example, 5 volts, and the control units which are important for starting can thus no longer be supplied with sufficient voltage.

In addition, when vehicle accidents occur, it is occasionally found that electrical leads, but also equipment, are damaged especially in the case of an accident which is primarily in the engine compartment (area at risk during a crash), which can lead to a spark flashover or an arc if there is a short circuit. As a result, if fuel escapes at the same time, for example due to damaged lines, fires may occur.

Therefore, in motor vehicle electrical systems, problems are posed by the (automatic) protection of the installed vehicle battery against exhaustive discharge, such as may occur, for example, during transportation overseas, when the vehicle is stationary for a relatively long time, and when there is excessive loading and thus corresponding discharging, by the protection of the vehicle's electrical system and its components against polarity reversal, by the disconnection of at least electrical vehicle components which are at risk during a crash and of leads during a possible accident, and finally by the need to restore the basic setting in the event of disconnection occurring between the vehicle's electrical system and the battery, i.e. to return the vehicle to a normal state.

It is currently known to ensure protection of the battery against exhaustive discharge during transportation overseas by disconnecting the battery manually from the vehicle's electrical system using an isolating switch after the vehicle has been loaded onto the ship. During unloading, that is to say so that the vehicle can be driven off the ship, the isolating switch is closed again and ultimately removed by the appropriate dealer before the vehicle is ultimately put into service.

The aforementioned problem of incorrect polarity in the case of an external starter device is particularly serious because the damage can be overcome only by replacing, at a correspondingly high cost, the inadequately protected electrical and electronic components which have been irreparably damaged by the incorrect polarity.

The following specifications relate to known battery isolating switches and to the possibility of disconnecting a battery from its loads under certain circumstances if there is a risk of exhaustive discharge:

DE 34 02 372 A1, DE 42 11 578 C1, DE 33 03 185 A1, DE-B 1 086 322.

Thus, in DE 34 02 732 A1, two conductive electrodes which lie coaxially one opposite the other are disconnected by means of an insulator element which is located between them but which in normal circumstances is bridged by an electrically conductive switching bridge. The switching bridge can be opened by axially displacing a sheath.

DE 42 11 578 C1 presents a battery isolating device for motor vehicles having a battery isolating switch which can be actuated manually from the battery space and under remote control from the driver's seat with a main safety switch. Before the battery isolating switch is possibly opened, all the loads which are connected to the ignition lock must firstly be switched off and an engine turning-off procedure must be initiated.

A further battery isolating switch which is known from DE 33 03 185 A1 has, firstly, a handle for manually switching it on and off as desired, by means of cam running tracks arranged in a sheath, and, secondly, actuation in order to turn it off can also be triggered by another power source, for example an explosive cartridge which can be triggered by a pulse as a function of the triggering of a fire detector.

Furthermore, polarity reversal prevention devices are known, for example in battery chargers or when batteries are connected to the electrical systems of motor vehicles, from DE 42 31 970 C2 or DE 196 03 117 A1.

The known arrangements for the prevention of polarity reversal for a battery charging system and/or an electrical system for motor vehicles are usually are based on the fact that a sensor circuit is provided which senses the polarity of the battery which is to be connected and permits connection, for example by closing a switch, to a charger or to a vehicle's electrical system only if the polarity is correct.

The circuit for protecting against polarity reversal for a battery charger corresponding to DE 42 31 970 C2 operates in such a way that a microprocessor which senses the polarity reversal supplies the connection point for the positive pole of the battery which is to be charged with a positive voltage, via a voltage divider, even if the microprocessor cannot reliably detect correct polarity at a first detection input. In fact, when there is incorrect polarity across this voltage device, a measuring voltage for evaluation by the microprocessor is detected at the voltage divider which is so severely shifted in the direction of negative values that, in the event of polarity reversal, a correct polarity reversal message can be output and appropriate measures taken, for example the polarity of the terminals can be reversed.

In the polarity reversal prevention circuit according to DE 196 03 117 A1, MOSFET transistors are provided by means of which the voltage drop caused by the protection circuit is significantly reduced so that the protection circuit can be used even with low dc voltages.

In addition, DE-B 1 086 322 discloses an electrical high-voltage switch in which an axially moveable pin-shaped switching contact and two fixed contacts which cooperate with it are provided. Both the switching contact and the fixed contacts are arranged in a switchroom which is surrounded by a double-walled casing. This ensures that at any rate, owing to the metallic nature of the outer wall of the switchroom, parts with a large field strength lie outside the switchroom. There are no connections to a battery isolating switch operating with low voltage.

It is known, in addition, that in a discharge protection circuit for the current accumulator in a motor vehicle (DE 40 40 405 A1) a self-latching circuit is provided which becomes active when the vehicle is switched off and then reliably electrically disconnects loads which are still switched on from the current accumulator by actuating an electrical isolating switch device.

In addition, in a device for protecting a main current path in a transportation means, it is known (DE 41 10 240 C1) to arrange an electronically drivable turn-off means which is accommodated near to the battery and has the purpose of bringing about a controlled disconnection between the main current path and the battery as soon as a current which is characteristic of a short-circuit situation is detected. The turn-off means can be, for example, an electromagnetic actuator or else an explosive capsule.

The invention is based on the object of ensuring, on the one hand, that a disconnection procedure, that is to say isolation of the battery from the vehicle's electrical system, which is to be carried out for a multiplicity of reasons is possible quickly and without difficulty, in which case, in order to avoid exhaustive discharge of the battery, the element which performs the switching over is itself isolated from the vehicle's electrical system, but on the other hand of ensuring that the vehicle can be re-activated, that is to say the battery can be connected to the vehicle's electrical system, at any time without a relatively large amount of effort and installation work.

SUMMARY

A method according to this invention uses a standardized device that both disconnects, preferably automatically, the battery from the vehicle's electrical system for transportation, in the event of the vehicle being stationary for a relatively long period or even an accident, and also ensures that, when the vehicle has absolutely zero current, the power supply to the safety device which is also cut off from the power supply by its own preceding isolation measure is restored by an operator opening one of the doors of the vehicle.

As a result, power connection lines to the safety device are closed by means of appropriate door contacts, and said lines can then connect the entire vehicle's electrical system to the battery again by means of the motor drive, actuated by said safety device, for the battery isolating switch.

This connection is made, at any rate, whenever there are no other inhibiting signals present.

It is therefore possible to assign a plurality of essential functions to the safety device, composed of multistage, motor-driven battery isolating switch, switching logic and associated sensor system, i.e. to make optimum use of the safety facilities which are provided by such a multistage isolating switch, and at the same time make available a high degree of operating convenience to the user of the vehicle.

In addition, the arrangement of a connector for starter aids in the vicinity of the high-current isolating switch, which, as an starting circuit-breaker, is part of the safety device, is advantageous. The connector for starter aids can be connected, for example, to the positive pole of an auxiliary battery, for example by means of a jump lead, or else to some other device which has the purpose of promoting the starting of a vehicle and which supplies an appropriately high starter current, for example to a drivable rectifier circuit which is fed with an alternating power-system voltage or can itself be used as a starter aid for a third vehicle.

It is also advantageous that the respectively occurring switching procedures do not make use of any relays which are unsuitable for the currents occurring here under extreme circumstances, for example possibly several hundred amps in the case of a starting process which runs from the connector for external starter means. In order to connect the various terminals, specifically the vehicle's electrical system, battery, connector for starting aids, loads which are at risk in an accident, a displaceable contact bridge is provided on a contact carrier. The contact bridge is driven by electrical positioning means, for example by motor-operated actuation, but hydraulic or electromagnetic drive means may also be provided.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DETAILED DESCRIPTION

Figure 1:
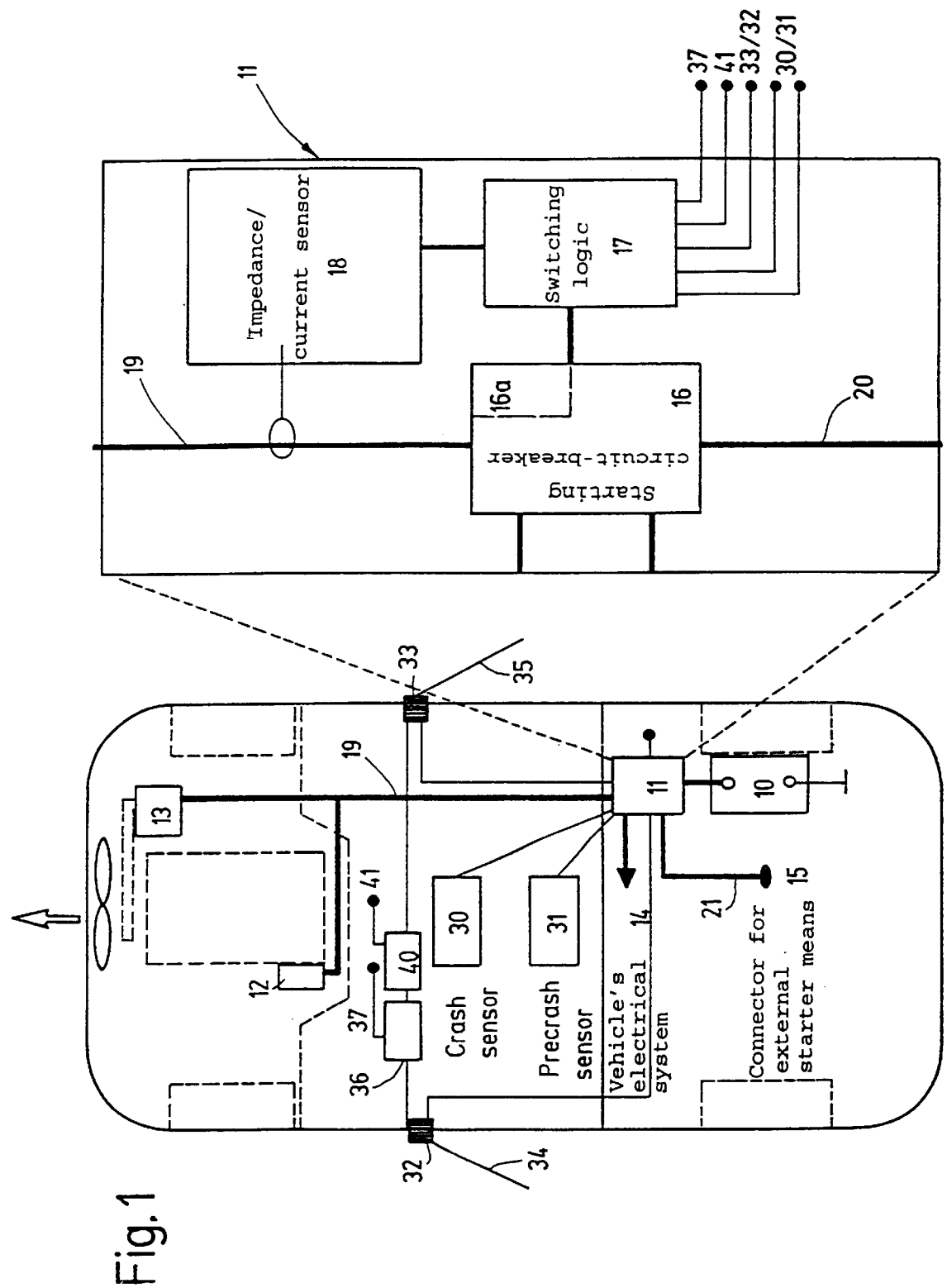
FIG. 1 shows a schematic overall view of a vehicle structure with loads and battery, and an extracted, enlarged view of a motor-operated isolating switch with switching logic and additional peripherals.

The vehicle structure in FIG. 1 which is shown by oval bordering makes it possible to recognize a battery 10 and a safety device 11 which is connected to the battery. The safety device 11 is connected to the battery via a connection terminal 20, to a connector 15 for external starter means via a connection terminal 21, to electrical components of a vehicle which are located in an area of the vehicle which is at risk in an accident or in a crash, for example generator 13 and starter 12, via a connection terminal 19, and to the vehicle's electrical system 14 via a connection terminal 22. These connection terminals are all high-current terminals which are connected directly to the respective contact assignments 19a for components which are at risk in a crash, 20a for the battery, 21a for the connector for external starter means and 22a for the vehicle's electrical system of the battery isolating switch, which is represented in FIG. 1 as a starting circuit-breaker 16 together with associated switching logic 17 and impedance/current sensor 18 in the bordered region of the safety device for which a separate drawing is given.

Within the vehicle structure it is also possible to recognize a so-called precrash sensor 31, a crash sensor 30 and door opening switches 32, 33, which are all connected via appropriate signal lines to sensor inputs of the switching logic 17, as can be seen on the right-hand side in FIG. 1.

In addition, an input arrangement 40 for manually inputting control instructions for the switching logic 17 is provided in the vehicle structure in FIG. 1, said input arrangement 40 being connected to the terminal 41 for the switching logic, and the ignition lock 36 with a terminal 37 is also provided.

Figure 2:
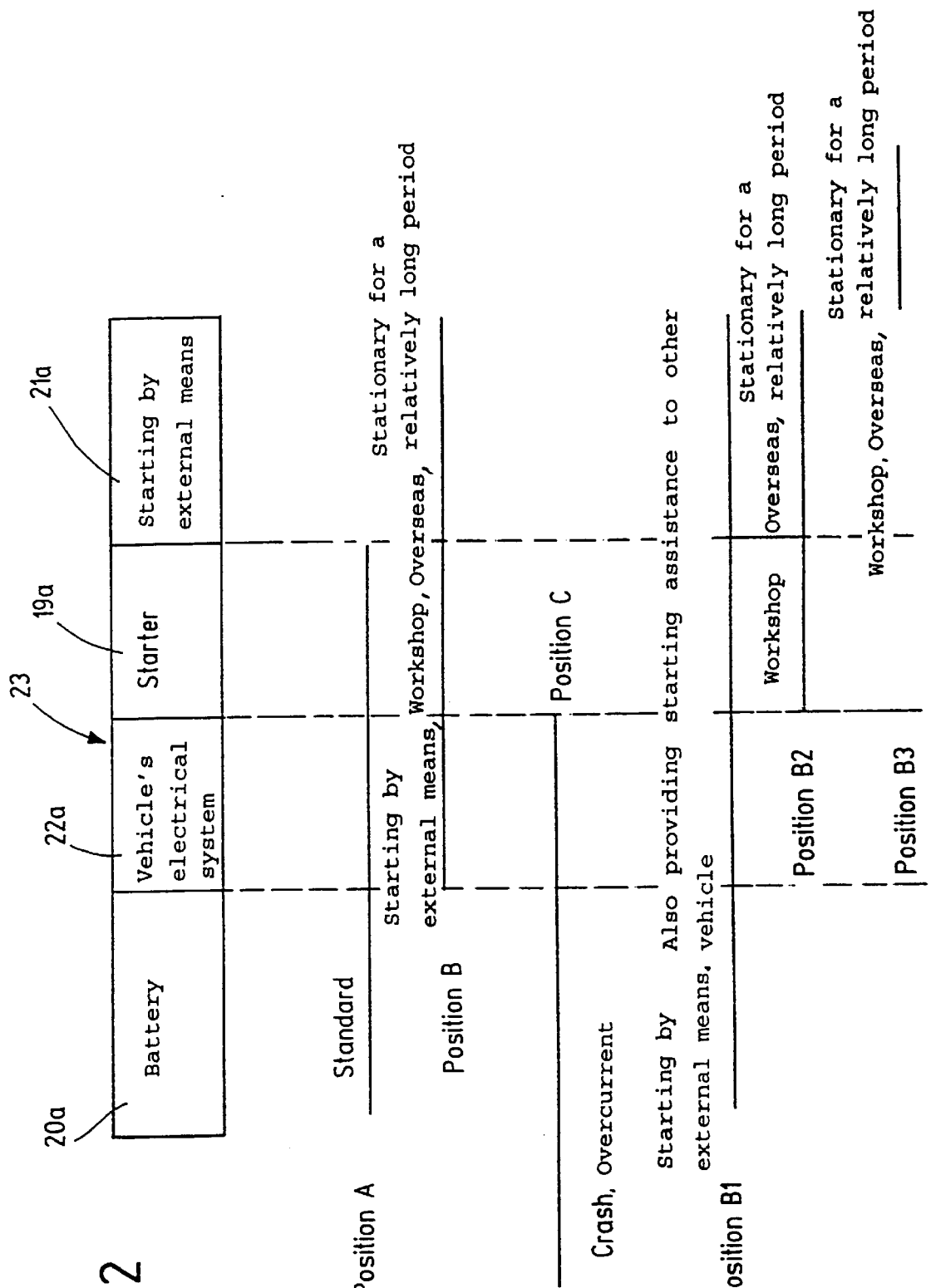
FIG. 2 is a schematic view of a possible exemplary embodiment of a battery isolating switch in the connection contact area and possible switch-over variants of the isolating switch and FIG. 3 comprises flowcharts showing switching procedures in the region of the switching logic which drives the isolating switch.

According to FIG. 2, the switch contacts or contact assignments 19a, 20a, 21a and 22a of the starting circuit-breaker 16 which are connected to the components mentioned above are part of a contact carrier 23 of which an exemplary and preferred embodiment is tubular, the individual switch contacts of which contact carrier 23 can be connected to one another in basically any desired way by means of contact bridges (not illustrated), which can be displaced by motor operation, of the battery isolating switch which operates therefore in its entirety as a starting circuit-breaker 16. Some of the possible switching connections are illustrated in FIG. 2 underneath the contact carrier 23 in the form of bold lines, the individual positions A, B, C, B1, B2, B3 pointing to possible switching connections which are implemented by the contact bridge, together with the appropriate labelling.

The home switched position of the switching logic 17 which it assumes when its own supply voltage is present and there are no instructions requiring it to do otherwise present at its inputs, or other signals which require a different reaction, corresponds to the corresponds to the position A (standard) in FIG. 2, i.e. the switching logic controls a corresponding motor-operated actuator element 16a for the starting circuit-breaker 16 as a battery isolating switch in such a way that the battery is connected to the vehicle's electrical system and to the further electrical components (starter) which are arranged in a region of the vehicle which is possibly at risk in a crash.

By way of example, the following switching-over possibilities can then be implemented starting from this standard position.

Manual Disconnection of the Battery

Such manual disconnection of the battery is carried out, for example, by an operator inputting instructions using an appropriate input unit 40 when the vehicle is expected to be stationary for a relatively long time, for example when it is being shipped or else during production, or when in the workshop and the like.

The opening of the battery isolating switch which corresponds to disconnection of the battery from the vehicle's electrical system and from the starter/generator circuit (Position B in FIG. 2, possibly also subposition B2 or B3) can be carried out using a menu in, for example, a combined instruction in the vehicle. The menu item should be at least on a lower operating level and be accessible, for example, only by means of a code.

Figure 3:
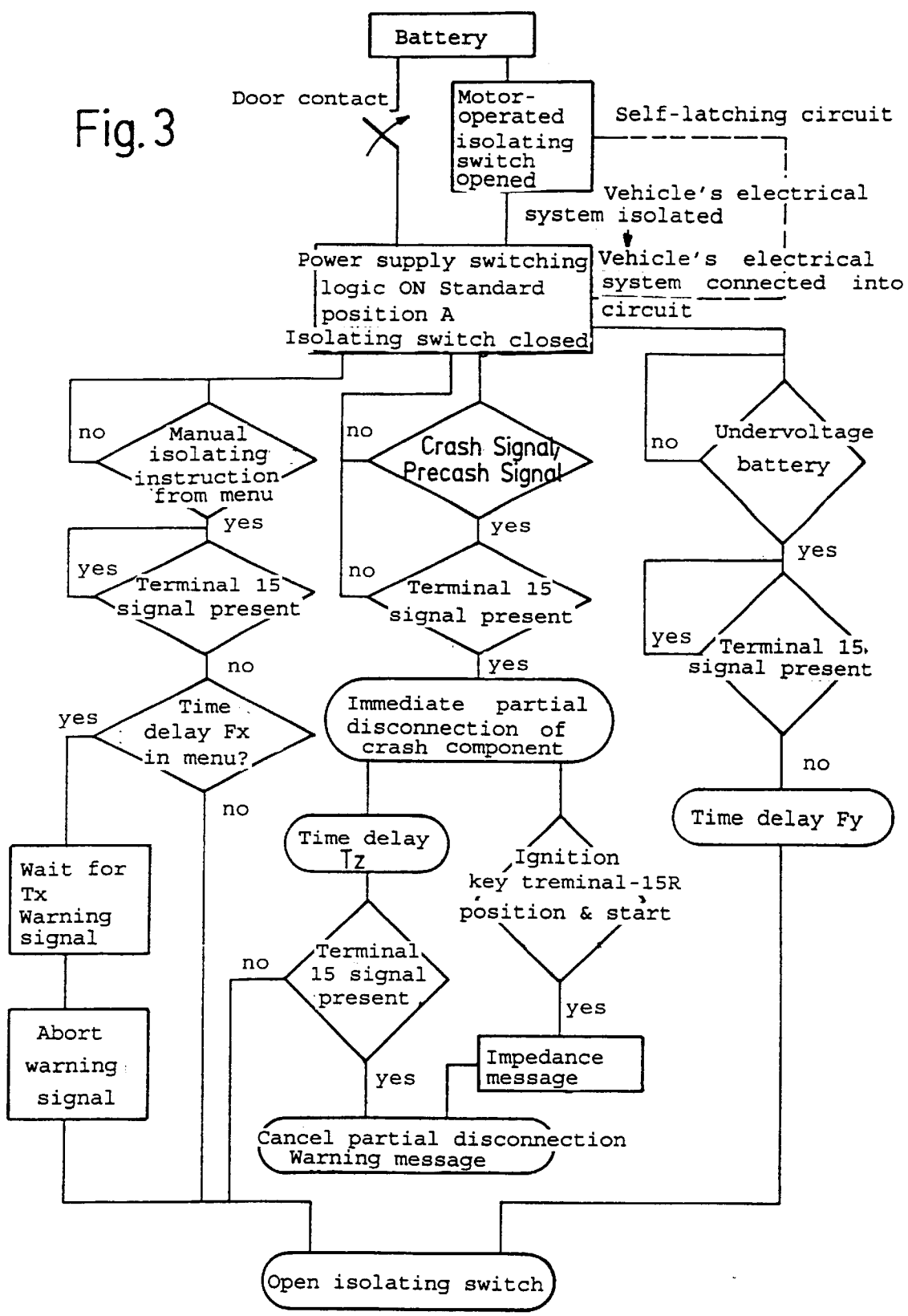

In accordance with the illustration in FIG. 3, left-hand column, a vehicle operating signal is used as protection against unauthorized opening while the vehicle is operating, for example a signal which is present at terminal 15 or terminal 15R of the ignition lock 36 can be used, said signal being considered below as representative of the ongoing operation of the vehicle and being designated as terminal-15 signal. The switch logic 17 disconnects to the battery only if the terminal-15 signal is not present.

In this context, the battery can be switched off either immediately, for example during production or when the vehicle is in the workshop, in which case an appropriate menu item is selected, or else by way of a time delay which is desired in the case of shipping, for example. The disconnection Tx with this time delay is carried out with a time constant of, for example, between 30 seconds and 2 minutes, an audible or visual warning signal being triggered during this time delay in order to indicate that the disconnection with a time delay is taking place. This alarm signal goes out when the battery has been disconnected. In this way, on the one hand, the operator is provided with acknowledgement that the function has been triggered. Furthermore, for the operator there is the possibility of leaving the vehicle during this time, and finally the termination of the warning message provides unambiguous information that the battery has actually been disconnected. Because the labels in the blocks on the flowcharts in FIG. 3 are self-explanatory, there is no need for particular details to be given on them once more.

Furthermore, it is possible for the submenu from which the disconnection instruction can be called to be set as a standard (default) in production or before the vehicle is shipped, so that calling the menu item does not waste any time. Furthermore, it is possible to call (i.e. set continuously) the manual disconnection instruction at the works and to open the switch with a time delay when the terminal 15 drops out. After the transportation is terminated, this mode is then cancelled again.

Because an objective which is aimed at is to disconnect the battery from the vehicle's electrical system so that the battery is switched in such a way that there are no loads acting in it, as a result of this the switching logic 17 which controls the starting circuit-breaker 16 and which is, of course, connected to the vehicle's electrical system, is also disconnected from the battery, which is necessary. At any rate, this is the most appropriate option, and is therefore a preferred feature. Further, in order to be able to activate the vehicle without considerable installation work, the procedure adopted is that the battery isolating switch is closed again, that is to say is connected to the vehicle's electrical system and starter area, by means of special door contacts 32, 33 which are triggered when the doors 34, 35 open.

This is also appropriate because during transportation overseas the key usually remains in the ignition lock so that the insertion of the key into the ignition lock cannot be used as a signal for closing the battery isolating switch, which would in any case require a separate contact point because the specifications require the vehicle's electrical system to be currentless.

When door contacts are used it is appropriate for them primarily to supply voltage only to the switching logic and the starting circuit-breaker via separate feed lines which are connected to the battery, after which the switching logic then restores the position A (standard) in the absence of any other operating states which prevent the battery from being connected. During the time for which a door is opened, the battery must therefore be connected again to the vehicle's electrical system via the switching logic 17, which, owing to the direct triggering of the switching logic 17, is possible without difficulty even when the door is opened for only a very brief time.

Disconnection of the Battery in the Event of Undervoltage

In the event of a vehicle being deactivated over a relative long time, the battery should also be disconnected from its loads if the user himself does not make use of the possibility of disconnecting it, provided, for example, by the menu, or fails to realize that if the battery is in any case already possibly depleted, even a relatively short period of deactivation can, owing to the presence of quiescent currents, lead to the battery becoming completely exhausted. In order to enable the battery to start and protect it, it must therefore also be automatically disconnected from the vehicle's electrical system, in which case reliable disconnection can then in turn be ensured only if the vehicle is not operational. According to the switching sequence in the right-hand column in FIG. 3, a disconnection instruction is issued by the switching logic whenever it detects an undervoltage from the battery by means of appropriate sensors, one of which is also connected to the battery 10. The automatic disconnection is, however, permitted only if there is no terminal-15 signal present, that is to say the vehicle is not operational. In addition, a delay time, which should be, for example, at least 10 minutes, is taken into account for the disconnection. During this time there must be an undervoltage accompanied by the absence of a terminal-15 or terminal-15R signal. If this is the case, the switching logic 17 automatically disconnects the battery from the vehicle's electrical system 14, including the starter area, so that the isolating switch is preferably moved into position B3 in accordance with FIG. 2.

The aforesaid long time constant of, for example, 10 minutes is also justified by the fact that it enables short-term interference which is caused by loading of the battery, for example a starting process or a wake-up of the CAN subscribers, and which causes the battery voltage to drop to be gated out.

In this case also, the reactivation of the vehicle is carried out by the driver by opening a door with a mechanical key, simply by the fact that a central locking system which may be present is not supplied with current either. In this case, as already explained above with reference to manual disconnection, the battery is therefore connected again to the vehicle's electrical system by means of a door contact 32, 33.

If, as can be expected, there is still an undervoltage present, the driver has the period of the aforementioned disconnection time constant of <10 minutes available to start the engine and thus charge the battery. After the engine has been started, the voltage is in any case raised by the generator and the time constant is no longer significant because the switching logic can no longer perceive a battery undervoltage.

Disconnection of the Battery Triggered by a Crash Signal

Disconnection of the battery in the case of a precrash or crash signal can be carried out only when the terminal-15/-15R signal is present. However, here, it is not—at any rate not primarily—the battery which is disconnected from the entire vehicle's electrical system but rather only the starter/generator circuit including the loads in the area which is at risk in a crash. In this state, the vehicle is still drivable and all other safety devices are still completely operational.

Because operating the vehicle for a relatively long time in this state may cause damage, for example overheating of the internal combustion engine if an electrically driven fan is also switched off, the partial disconnection of the components which are at risk in a crash is automatically cancelled again in case the vehicle remains in operation over a defined delay time period Tz, and a warning message is possibly issued to the driver. This cancelling of the partial disconnection is conditional on a terminal-15 signal continuing to be present. It may prove appropriate to open the battery isolating switch completely, that is to say to make the entire vehicle currentless, in one refinement of the invention when there is no terminal-15 signal present, which indicates operational incapability of the vehicle after a crash. This is also given as an alternative solution in the central column in FIG. 3.

It is also possible to connect into the circuit the partially disconnecting components if there is only slight damage (crash signal transmitted) via the ignition lock in that the driver firstly places the key in the home position and then starts the internal combustion engine. In this case, it is recommended to carry out an impedance measurement using the impedance sensor 18 in order to determine whether there is damage to the leads (line 19), and the switching logic permits the partially disconnected components to be connected only if this message indicates that there is no damage.

However, a partial disconnection takes place in any case whenever a raised current, which indicates a short-circuit, is measured in the region of components which are at risk in a crash, using the impedance or current sensor 18 in the connecting line 19 to said components.

In the event of an incorrect triggering, if for example the precrash sensor 31 has triggered but no crash signal has been received from the crash sensor 30, it is also possible to perform the connection into the circuit after an impedance measurement using a time constant.

Disconnecting and Connecting the Battery when Starting Using External Means

In addition, the switching logic 17 senses, using a sensor 15, the potential at the connector 15 for external starter means, which in the standard position A is normally not connected to the other vehicle components. If a potential which is more positive than or at least equal to the potential at the positive pole of the battery is obtained at this connector 15 for external starter means, the connector 15 for external starter means is then preferably automatically connected at least to the starter/generator circuit, i.e. the isolating switch is moved into the appropriate position B2 in FIG. 2. However, it is also possible to switch over the battery isolating switch to position B, and finally also to position B1 in FIG. 2, in which case only the vehicle's own battery is not also connected in position B, because in the event of possible exhaustive discharge it could also, under certain circumstances, excessively load the external starter device, whereas in position B1 the vehicle's own battery can possibly also help in the case of starting by external means, or finally in this position it is also possible to provide external starting assistance to another vehicle in that a connection is made to another vehicle by the connector 15 for external starter means, which is now connected to the vehicle battery.

If, in contrast, the switching logic 17 measures a negative signal at the connector 15 for external starter means, a polarity reversal has occurred and the connection (transfer to positions B, B1 or B2, respectively) is not brought about. As a result, reliable protection against a polarity reversal is ensured.

The decision as to whether the possibility of position B1 (parallel connection of the other vehicle's battery to the battery of the driver's own vehicle) or the position B is selected, in order to load the other vehicle's battery less, can be taken on the basis of a free selection in the menu by the operator or can be appropriately programmed in the switching logic 17 from the outset.

When the internal combustion engine starts, the contact to the connector 15 for external starter means is automatically disconnected again by means of the switching logic 17 if the current was flowing from the other vehicle to the driver's own vehicle, for which purpose the flow of current from the generator, which is of course sensed by the current sensor 18 in the line 19, into the vehicle's own battery or into the battery of the other vehicle or an "engine running" signal can be used.

It is also possible to evaluate the voltage level in the lines 19 and 20 in comparison with the voltage at the connector 15 for external starter means. If the voltage level in said lines is at least as high, the connector 15 for external starter means is disconnected and the battery 10 is connected to the starter and vehicle's electrical system.

So that the connector for external starter means can always be assigned a defined potential, which is an advantage for the sensor system, the connector for external starter means is preferably connected to earth by means of a high-impedance resistor (pull-down resistor) so that changes in voltage at the connector 15 for external starter means can be evaluated in defined terms.

Automatic switching over by means of the switching logic 17 is also possible when starting assistance is provided to another vehicle. For this purpose, the battery of the driver's own vehicle is connected to the connector for external starter means, i.e. the battery isolating switch is moved into the position B1 in FIG. 2. In this case, the voltage between the battery 10 of the driver's own vehicle and an, in this case minimum, positive voltage (for example of the order of magnitude of 5 volts) is evaluated again at the connector 15 for external starter means, after which the connection is set up. Disconnection after a predefined time delay can be carried out automatically. If the switch-on condition still applies after this, the battery of the driver's own vehicle is connected again to the connector 15 for external starter means.

Although the invention has been described in detail with reference to certain preferred embodiments and specific examples, variations and modification exist within the scope and spirit of the invention as described and as defined in the following claims.

What is claimed is:

1. A method for operating a safety device in a motor vehicle, the safety device containing a multistage high-current battery isolating switch coupled between a battery in the motor vehicle and an electrical system of the motor vehicle for disconnecting the battery from the motor vehicle's electrical system, wherein a switching logic is coupled to the safety device for actuating the safety device, the method comprising the steps of:

actuating with the switching logic the safety device to disconnect the battery from the motor vehicle's electrical system upon sensing with the switching logic the presence of a manual instruction input to the switching logic, and upon the expiration of a time delay after the manual input has been sensed, and outputting a warning signal from the switching logic during the time delay;

sensing the presence of at least one vehicle operating signal and preventing actuation of the safety device to disconnect the battery from the motor vehicle's electrical system when the vehicle operating signal is present; and in the event of actuation of the safety device to disconnect the battery from the motor vehicle's electrical system, actuating the safety device to reconnect the battery to the motor vehicle's electrical system upon the activation of a door contact switch.

2. The method of claim 1 further including the step of sensing the voltage level of the battery and actuating the safety device to disconnect the battery from the motor vehicle's electrical system when the battery is in an undervoltage condition for a predetermined period of time.

3. A method for operating a safety device in a motor vehicle, the safety device containing a multistage high-current battery isolating switch coupled between a battery in the motor vehicle and an electrical system of the motor vehicle for disconnecting the battery from the motor vehicle's electrical system, the method comprising the steps of:

actuating the safety device to disconnect the battery from at least one electrical component of the vehicle upon sensing a crash signal generated by a crash sensor in the vehicle, wherein said at least one electrical component of the vehicle to be disconnected comprises an electrical component that is in an area of the vehicle that may be damaged by the crash;

sensing the presence of at least one vehicle operating signal and disconnecting the at least one electrical component only if the at least one vehicle operating signal is present at this time and the disconnection of the at least one electrical component is automatically cancelled in case the at least one vehicle operating signal is present for longer than a predefined delay time after the disconnection has been performed; and in the event of actuation of the safety device to disconnect the battery from the motor vehicle's electrical system, actuating the safety device to reconnect the battery to the motor vehicle's electrical system upon the activation of a door contact switch.

4. The method of claim 3 further including the step of actuating the safety device to reconnect the electrical component to the battery when an ignition switch of the vehicle is actuated to start the vehicle and an impedance check of the electrical component with an impedance sensor in the vehicle determines that the electrical component was not damaged.

5. The method of claim 4 wherein the step of actuating the safety switch to reconnect the electrical component to the battery takes place upon the expiration of a time delay after the impedance check determines that the electrical component was not damaged.

6. A method for operating a safety device in a motor vehicle having a connector for an external starting voltage source, the connector coupled to the safety device, the safety device containing a multistage high-current battery isolating switch coupled between a battery in the motor vehicle and an electrical system of the motor vehicle for disconnecting the battery from the motor vehicle's electrical system, the method comprising the steps of:

actuating the safety device to disconnect the battery from the motor vehicle's electrical system upon the occurrence of actuation conditions in the vehicle;

sensing the presence of at least one vehicle operating signal and preventing actuation of the safety device to disconnect the battery from the motor vehicle's electrical system when the vehicle operating signal is present;

in the event of actuation of the safety device to disconnect the battery from the motor vehicle's electrical system, actuating the safety device to reconnect the battery to the motor vehicle's electrical system upon the activation of a door contact switch; and sensing a voltage of an external starting voltage source coupled to the connector and actuating the safety device to connect the connector for the external starting voltage source to at least a starting system of the vehicle when the sensed voltage of the external starting voltage source is greater than a voltage of the vehicle battery.

7. The method of claim 6 further including the step of actuating the safety device to disconnect the external starting voltage source from at least the starting system of the vehicle upon the occurrence of any one of the following conditions:

detection of a starting current from a generator or alternator of the vehicle;

detection of a voltage from a power system of the vehicle that is greater than the voltage of the external voltage starting source; and detection of an engine of the vehicle running.

8. The method of claim 6, wherein when the sensed voltage of the external starting voltage source is no more than a predetermined level, actuating the safety device to disconnect the external starting voltage source from the vehicle battery after the expiration of a time delay.

9. The method of claim 8 wherein the predetermined level is five volts.

10. The method according to claim 1 wherein the step of sensing the presence of at least one vehicle operating signal comprises the step of sensing the presence of a signal at an ignition lock of the motor vehicle.

11. The method according to claim 3 wherein the step of sensing the presence of at least one vehicle operating signal comprises the step of sensing the presence of a signal at an ignition lock of the motor vehicle.

12. The method of claim 3 further including the step of sensing the voltage level of the battery and actuating the safety device to disconnect the battery from the motor vehicle's electrical system when the battery is in an undervoltage condition for a predetermined period of time.

13. The method of claim 3 further including the step of actuating the safety device to reconnect the at least one electrical component to the vehicle battery upon the vehicle operating signal remaining present for a predetermined period of time after the crash signal has been sensed.

14. The method according to claim 3, wherein the motor vehicles includes a switching logic coupled to the safety device for actuating the safety device, the method further including the steps of sensing with the switching logic the presence of a manual instruction input to the switching logic, and upon the expiration of a time delay after the manual input has been sensed, actuating the safety device with the switching logic to cause the safety device to disconnect the battery from the motor vehicle's electrical system, and, outputting a warning signal from the switching logic during the time delay.

15. The method of claim 14 further including the step of actuating the safety device to reconnect the at least one electrical component to the vehicle battery upon the vehicle operating signal remaining present for a predetermined period of time after the crash signal has been sensed.

16. The method of claim 3, wherein the vehicle has a connector for an external starting voltage source, the connector coupled to the safety device, the method further including the step of sensing a voltage of an external starting voltage source coupled to the connector at the connector source and actuating the safety device to connect the connector for the external starting voltage source to at least a starting system of the vehicle when the sensed voltage of the external starting voltage source is greater than a voltage of the vehicle battery.

17. The method of claim 14, wherein the vehicle has a connector for an external starting voltage source, the connector coupled to the safety device, the method further including the step of sensing a voltage of an external starting voltage source coupled to the connector at the connector source and actuating the safety device to connect the connector for the external starting voltage source to at least a starting system of the vehicle when the sensed voltage of the external starting voltage source is greater than a voltage of the vehicle battery.

18. The method of claim 3, wherein the at least one electrical component of the vehicle to be disconnected does not include an electrical component that is in an area of the vehicle that may not be damaged by the crash.

19. An apparatus for operating a safety device in a motor vehicle, the safety device containing a multistage high-current battery isolating switch coupled between a battery in the motor vehicle and an electrical system of the motor vehicle for disconnecting the battery from the motor vehicle's electrical system, wherein a switching logic is coupled to the safety device for actuating the safety device, the apparatus comprising:

means for actuating with the switching logic the safety device to disconnect the battery from the motor vehicle's electrical system upon sensing with the switching logic the presence of a manual instruction input to the switching logic, and upon the expiration of a time delay after the manual input has been sensed, and for outputting a warning signal from the switching logic during the time delay;

means for sensing the presence of at least one vehicle operating signal and for preventing actuation of the safety device to disconnect the battery from the motor vehicle's electrical system when the vehicle operating signal is present; and means for actuating the safety device to reconnect the battery to the motor vehicle's electrical system upon the activation of a door contact switch, in the event of actuation of the safety device to disconnect the battery from the motor vehicle's electrical system.

20. An apparatus for operating a safety device in a motor vehicle, the safety device containing a multistage high-current battery isolating switch coupled between a battery in the motor vehicle and an electrical system of the motor vehicle for disconnecting the battery from the motor vehicle's electrical system, the apparatus comprising:

means for actuating the safety device to disconnect the battery from at least one electrical component of the vehicle upon sensing a crash signal generated by a crash sensor in the vehicle, wherein said at least one electrical component of the vehicle to be disconnected comprises an electrical component that is in an area of the vehicle that may be damaged by the crash;

means for sensing the presence of at least one vehicle operating signal and for disconnecting the at least one electrical component only if the at least one vehicle operating signal is present at this time and the disconnection of the at least one electrical component is automatically cancelled in case the at least one vehicle operating signal is present for longer than a predefined delay time after the disconnection has been performed; and means for actuating the safety device to reconnect the battery to the motor vehicle's electrical system upon the activation of a door contact switch, in the event of actuation of the safety device to disconnect the battery from the motor vehicle's electrical system.

21. An apparatus for operating a safety device in a motor vehicle having a connector for an external starting voltage source, the connector coupled to the safety device, the safety device containing a multistage high-current battery isolating switch coupled between a battery in the motor vehicle and an electrical system of the motor vehicle for disconnecting the battery from the motor vehicle's electrical system, the apparatus comprising:

means for actuating the safety device to disconnect the battery from the motor vehicle's electrical system upon the occurrence of actuation conditions in the vehicle;

means for sensing the presence of at least one vehicle operating signal and for preventing actuation of the safety device to disconnect the battery from the motor vehicle's electrical system when the vehicle operating signal is present;

means for actuating the safety device to reconnect the battery to the motor vehicle's electrical system upon the activation of a door contact switch, in the event of actuation of the safety device to disconnect the battery from the motor vehicle's electrical system; and means for sensing a voltage of an external starting voltage source coupled to the connector and actuating the safety device to connect the connector for the external starting voltage source to at least a starting system of the vehicle when the sensed voltage of the external starting voltage source is greater than a voltage of the vehicle battery.

\* \* \* \* \*